US008841988B2

(12) United States Patent
Summerford et al.

(10) Patent No.: US 8,841,988 B2
(45) Date of Patent: Sep. 23, 2014

(54) SYSTEM HAVING KEY FOB OPERABLE TO REMOTELY CONTROL A GARAGE DOOR VIA REMOTE KEYLESS ENTRY RECEIVER AND GARAGE DOOR OPENER TRANSMITTER INTERCONNECTED BY VEHICLE BUS

(75) Inventors: Jason T. Summerford, Novi, MI (US); Mike Fawaz, Plymouth, MI (US)

(73) Assignee: Lear Corporation, Southfield, MI (US)

( * ) Notice: Subject to any disclaimer, the term of this patent is extended or adjusted under 35 U.S.C. 154(b) by 2105 days.

(21) Appl. No.: 11/751,746

(22) Filed: May 22, 2007

(65) Prior Publication Data

US 2008/0291047 A1 Nov. 27, 2008

(51) Int. Cl.

| | |
|---|---|
| ***B60R 25/00*** | (2013.01) |
| ***G05B 19/00*** | (2006.01) |
| ***G06F 7/00*** | (2006.01) |
| ***G08B 29/00*** | (2006.01) |
| ***H04B 1/00*** | (2006.01) |
| ***G07C 9/00*** | (2006.01) |

(52) U.S. Cl.

CPC .. *G07C 9/00182* (2013.01); *G07C 2009/00928* (2013.01); *G07C 2009/00888* (2013.01); *G07C 2009/00793* (2013.01)

USPC .......... 340/5.7; 340/5.64; 340/5.71; 340/5.72

(58) Field of Classification Search

CPC ........................................................ B60R 25/00

USPC .......... 340/5.7, 5.64, 5.71, 5.72, 426, 826.69, 340/825.72; 307/10.4, 10.5; 455/420, 418

See application file for complete search history.

(56) References Cited

U.S. PATENT DOCUMENTS

| | | | | |
|---|---|---|---|---|
| 5,398,284 | A | 3/1995 | Koopman, Jr. et al. | |
| 5,583,485 | A | 12/1996 | Van Lente et al. | |
| 5,614,885 | A | 3/1997 | Van Lente et al. | |
| 5,661,455 | A | 8/1997 | Van Lente et al. | |
| 5,864,297 | A | 1/1999 | Sollestre et al. | |
| 6,078,271 | A * | 6/2000 | Roddy et al. | 340/825.72 |
| 6,308,083 | B2 | 10/2001 | King | |
| 6,320,514 | B1 | 11/2001 | Flick | |
| 6,377,173 | B1 | 4/2002 | Desai | |
| 6,525,645 | B2 | 2/2003 | King et al. | |
| 6,759,942 | B2 * | 7/2004 | Bedi et al. | 340/5.72 |
| 6,982,626 | B2 * | 1/2006 | Nedorezov | 340/5.71 |
| 7,106,171 | B1 | 9/2006 | Burgess | |
| 7,142,849 | B2 * | 11/2006 | Neuman | 455/420 |
| 7,215,238 | B2 * | 5/2007 | Buck et al. | 340/5.23 |
| 2002/0067245 | A1 | 6/2002 | Campbell et al. | |
| 2005/0046545 | A1 | 3/2005 | Skekloff et al. | |
| 2006/0238297 | A1 | 10/2006 | Tang et al. | |
| 2006/0273878 | A1 | 12/2006 | Michmerhuizen et al. | |

* cited by examiner

*Primary Examiner* — Nam V Nguyen

(74) *Attorney, Agent, or Firm* — Brooks Kushman P.C.

(57) ABSTRACT

A garage door opener (GDO) system and method include a remote keyless entry (RKE) receiver and a GDO system interconnected by a vehicle bus. Upon receiving a RKE GDO request signal from a key fob, the RKE receiver forwards a command signal over the vehicle bus to the GDO transmitter. Upon receiving the command signal from the RKE receiver, the GDO transmitter transmits a garage door signal to a GDO receiver of a garage to control a garage door.

20 Claims, 3 Drawing Sheets

SYSTEM HAVING KEY FOB OPERABLE TO REMOTELY CONTROL A GARAGE DOOR VIA REMOTE KEYLESS ENTRY RECEIVER AND GARAGE DOOR OPENER TRANSMITTER INTERCONNECTED BY VEHICLE BUS

BACKGROUND OF THE INVENTION

1. Field of the Invention

The present invention relates to a vehicle having a remote keyless entry (RKE) system and a garage door opener (GDO) transmitter and, more particularly, to a vehicle having a RKE receiver and a GDO transmitter in communication with one another such that a key fob can enact GDO functions via the RKE receiver and the GDO transmitter.

2. Background Art

A garage door opener (GDO) system includes a portable transmitter and a GDO receiver. The GDO receiver is associated with a mechanism for opening and closing a garage door of a garage. When prompted by a user, the transmitter wirelessly transmits a garage door signal directly to the GDO receiver for controlling the garage door. The transmitter is programmed to transmit garage door signals having characteristics which the GDO receiver expects to receive for controlling the garage door. The GDO receiver ignores other garage door signals which do not have the characteristics.

The GDO system includes a transceiver integrated into a vehicle. The transceiver is programmable to learn the characteristics of the garage door signal which the GDO receiver expects to receive for controlling the garage door. Typically, the transceiver receives the garage door signal from the portable transmitter to learn the garage door signal characteristics. Subsequently, when prompted by a user, the transceiver wirelessly transmits a garage door signal having the characteristics directly to the GDO receiver for controlling the garage door.

The vehicle may include a remote keyless entry (RKE) system. In this case, a portable key fob wirelessly transmits RKE signals directly to the RKE receiver of the RKE system for controlling vehicle operations such as the locking or unlocking of the vehicle doors.

It would be desirable for the RKE receiver and the GDO transmitter of a vehicle to be operable with one another such that a key fob can remotely control a garage door via the RKE receiver and the GDO transmitter.

SUMMARY OF THE INVENTION

An object of the present invention includes a system having a key fob operable to remotely control a home appliance such as a garage door via a remote keyless entry (RKE) receiver and a transmitter such as a garage door opener (GDO) transmitter interconnected by a vehicle bus.

A further object of the present invention includes a vehicle having a RKE receiver and a transmitter such as a GDO transmitter interconnected by a bus of the vehicle for enabling a key fob to remotely control a home appliance such as a garage door via the vehicle.

Another object of the present invention includes a system having a RKE receiver and a GDO transmitter interconnected by a vehicle bus for enabling a key fob to communicate via the RKE receiver and the GDO transmitter with a GDO receiver associated with a garage door for remotely controlling the garage door.

A further object of the present invention includes a system having a key fob, a RKE receiver, and a GDO transmitter in which the RKE receiver communicates with the GDO transmitter over a vehicle bus for the GDO transmitter to wirelessly transmit a garage door signal to a GDO receiver associated with a garage door in response to the RKE receiver wirelessly receiving a RKE signal from the key fob.

Another object of the present invention includes a system having a key fob, a RKE receiver, and a GDO transmitter in which the RKE receiver communicates with the GDO transmitter over a vehicle bus for the GDO transmitter to wirelessly transmit a garage door signal to a GDO receiver associated with a garage door in response to the key fob wirelessly transmitting a RKE signal to the RKE receiver.

A further object of the present invention includes a system having a key fob, a RKE receiver, and a GDO transmitter in which the RKE receiver and the GDO transmitter are interconnected by a vehicle bus and in which the GDO transmitter transmits a garage door signal to the key fob for programming a button of the key fob such that upon subsequent actuation of the key fob button the key fob transmits a RKE signal to the RKE receiver which in turn communicates with the GDO transmitter over the vehicle bus for the GDO transmitter to transmit the garage door signal to a GDO receiver associated with a garage door.

Another object of the present invention includes a system having a key fob, a RKE receiver, and a GDO transmitter in which the RKE receiver and the GDO transmitter are interconnected by a vehicle bus and in which the key fob transmits a sequence of different RKE signals to the RKE receiver for the RKE receiver to communicate over the vehicle bus to the GDO transmitter such that the GDO transmitter transmits a garage door signal upon the key fob transmitting an expected RKE signal, wherein the key fob is programmed to subsequently transmit the expected RKE signal without transmitting any of the remaining different RKE signals upon user feedback indicating successful transmission of the garage door signal by the GDO transmitter.

A further object of the present invention includes a system having a portable transmitter, a RKE receiver, and a GDO transmitter in which the RKE receiver and the GDO transmitter are interconnected by a vehicle bus and in which the portable transmitter transmits a garage door signal to the RKE receiver which forwards the garage door signal to the GDO transmitter for the GDO transmitter to learn such that the GDO transmitter subsequently transmits the garage door signal to a GDO receiver associated with a garage door upon actuation of the GDO transmitter.

In carrying out the above objects and other objects, the present invention provides a GDO system. The GDO system includes a portable key fob for wirelessly transmitting a RKE GDO request signal upon a user actuating the key fob, a RKE receiver for wirelessly receiving the RKE GDO request signal, a GDO transmitter for wirelessly transmitting a garage door signal to a GDO receiver of a garage to control a garage door, and a vehicle bus connecting the RKE receiver and the GDO transmitter. Upon receiving the RKE GDO request signal from the key fob the RKE receiver forwards a command signal over the vehicle bus to the GDO transmitter. Upon receiving the command signal the GDO transmitter transmits the garage door signal.

The vehicle bus may include a Local Interconnect Network (LIN) and/or a Controller Area Network (CAN). The RKE receiver, the GDO transmitter, and the vehicle bus may be integrated into a vehicle. In this case, the RKE receiver is part of a RKE system of the vehicle.

The key fob may include a user activation input and be programmable in a learn mode. In this case, the key fob associates the user activation input with the transmission of the RKE GDO request signal from the key fob upon receiving the garage door signal from the GDO transmitter while the key fob is in the learn mode such that the key fob subsequently transmits the RKE GDO request signal in response to a user actuating the user activation input.

The key fob may be operable to transmit a plurality of different RKE signals including the RKE GDO request signal and be programmable in a learn mode. In this case, while in the learn mode the key fob sequentially transmits the different RKE signals until user feedback indicates transmission of the RKE GDO request signal by the key fob such that the key fob is made aware of which of the different RKE signals corresponds to the RKE GDO request signal. The key fob subsequently transmits the RKE GDO request signal without transmitting any of the remaining RKE signals in response to a user actuating the key fob.

The GDO system may further include a portable transmitter for wirelessly transmitting the garage door signal upon actuation by a user. In this case the GDO transmitter is programmable in a learn mode. While the GDO transmitter is the learn mode the portable transmitter is actuated to transmit the garage door signal. Upon reception of the garage door signal by the RKE receiver from the portable transmitter the RKE receiver forwards the garage door signal over the vehicle bus to the GDO transmitter for the GDO transmitter to learn. The GDO transmitter subsequently transmits the garage door signal in response to receiving the command signal from the RKE receiver.

Further, in carrying out the above objects and other objects, the present invention provides a GDO system having a RKE receiver, a GDO transmitter for transmitting a garage door signal to a GDO receiver of a garage to control a garage door, and a vehicle bus connecting the RKE receiver and the GDO transmitter. Upon receiving a RKE GDO request signal from a key fob the RKE receiver forwards a command signal over the vehicle bus to the GDO transmitter. Upon receiving the command signal the GDO transmitter transmits the garage door signal.

Also, in carrying out the above objects and other objects, the present invention provides a GDO method. The GDO method includes transmitting a RKE GDO request signal from a key fob. A RKE receiver receives the RKE GDO request signal. The RKE receiver communicates a command signal onto a vehicle bus connected to the RKE receiver in response to the RKE receiver receiving the RKE GDO request signal. A GDO transmitter connected to the vehicle bus receives the command signal from the vehicle bus. The GDO transmitter transmits a garage door signal for reception by a GDO receiver of a garage in order to control a garage door in response to the GDO transmitter receiving the command signal.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
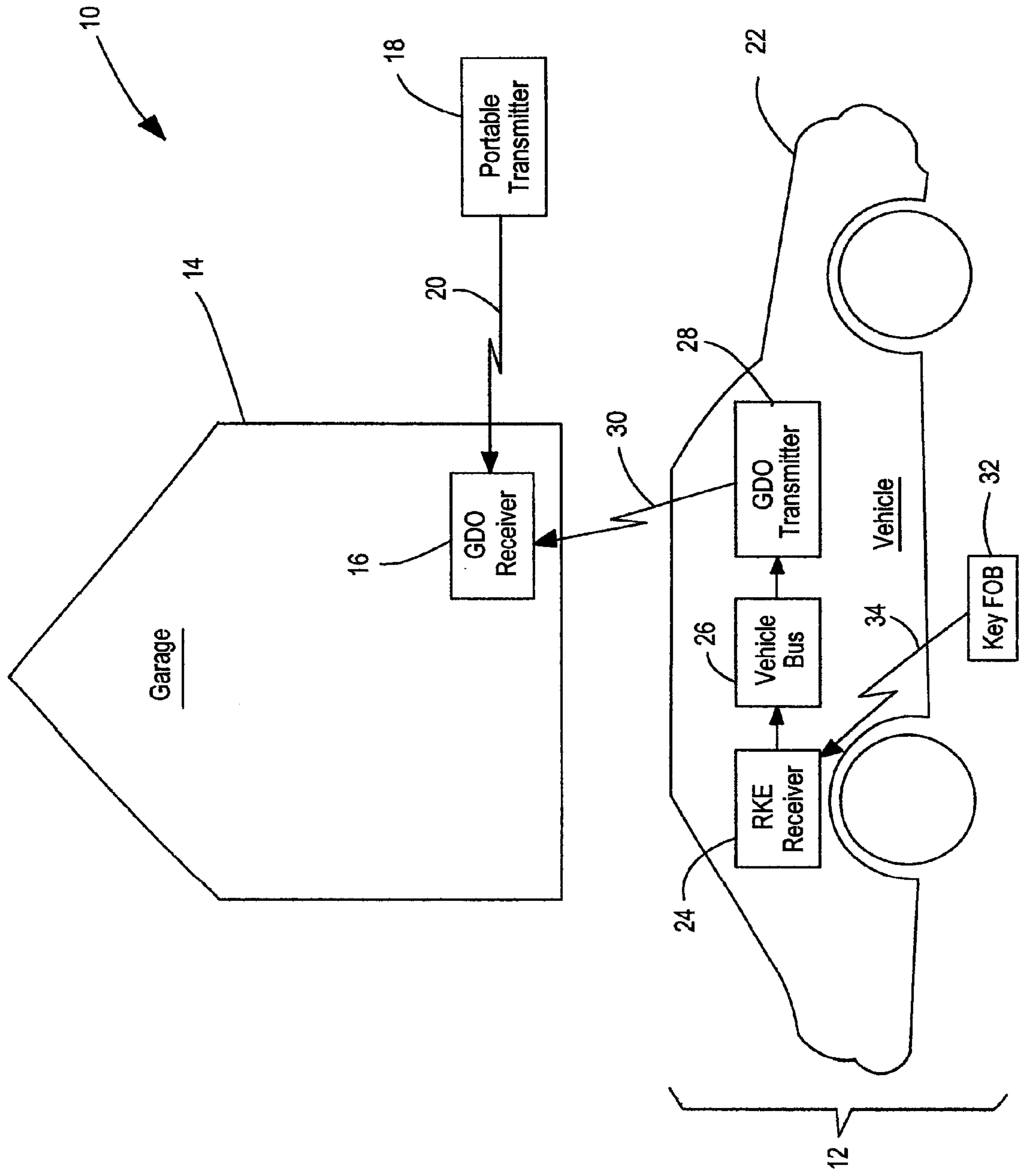
FIG. 1 illustrates a block diagram of an environment for a garage door opener (GDO) system having a key fob and a remote keyless entry (RKE) receiver and a garage door opener (GDO) transmitter interconnected by a vehicle bus in accordance with an embodiment of the present invention.

Referring now to FIG. 1, a block diagram of an environment 10 for a garage door opener (GDO) system 12 in accordance with an embodiment of the present invention is shown. Environment 10 includes a garage 14 having a garage door (not shown) and a GDO receiver 16. GDO receiver 16 actuates a mechanical device to open or close the garage door upon receiving an appropriate garage door signal (i.e., a garage door signal recognized by GDO receiver 16; a garage door signal having expected characteristics; an expected garage door signal; etc.). A garage door signal is appropriate in the sense that GDO receiver 16 is programmed to acknowledge the garage door signal and accordingly control (i.e., open or close) the garage door upon receiving the garage door signal while at the same time ignoring any other garage door signals. For instance, a garage door signal is appropriate when it contains a code or the like which GDO receiver 16 expects to receive for controlling the garage door. As such, if a garage door signal received by GDO receiver 16 does not contain the expected code, then the GDO receiver ignores this garage door signal. Likewise, if a garage door signal received by GDO receiver 16 contains the expected code, then the GDO receiver controls the garage door accordingly. In addition to coding, or alternatively, the appropriateness of a garage door signal may depend on other factors such as its frequency, modulation, etc.

Environment 10 includes a portable transmitter 18. Transmitter 18 wirelessly transmits a garage door signal 20 directly to GDO receiver 16 in response to a user actuating the transmitter. Transmitter 18 has been previously programmed such that garage door signal 20 is an appropriate garage door signal expected to be received by GDO receiver 16 for controlling the garage door.

Environment 10 includes a vehicle 22. Vehicle 22 includes a remote keyless entry (RKE) receiver 24, a vehicle bus 26, and a GDO transmitter 28. RKE receiver 24 is operable for wirelessly receiving RKE signals and providing the RKE signals to a RKE system of vehicle 22 for controlling vehicle operations such as the locking or unlocking of the vehicle doors, turning on or off the vehicle lights, etc. GDO transmitter 28 is operable to wirelessly transmit a garage door signal 30 directly to GDO receiver 16. Vehicle bus 26 runs through vehicle 22 and is an electronic communications network that interconnects components inside of the vehicle; i.e., Local Interconnect Network (LIN), Controller Area Network (CAN), and others. GDO transmitter 28 may generate garage door signal 30 in response to a user depressing a button of the GDO transmitter. GDO transmitter 28 may be previously programmed such that garage door signal 30 is an appropriate garage door signal expected to be received by GDO receiver 16 for controlling the garage door. As such, garage door signal 30 from GDO transmitter 28 and garage door signal 20 from portable transmitter 18 represent essentially the same garage door signal.

RKE receiver 24 and GDO transmitter 28 are both connected to vehicle bus 26. As such, vehicle bus 26 interconnects RKE receiver 24 and GDO transmitter 28 to one another. RKE receiver 24 communicates with GDO transmitter 28 over vehicle bus 26 to control the operation of the GDO transmitter for transmitting garage door signal 30.

GDO system 12 includes a vehicle-side part and a user-side part. RKE receiver 24 and GDO transmitter 28 interconnected by vehicle bus 26 form the vehicle-side part of GDO system 12. A key fob 32 forms the user-side part of GDO system 12. Key fob 32 is a portable unit intended to be carried by a user such as a user of vehicle 22. Key fob 32 generates an RKE signal 34 either passively or actively upon actuation of the key fob by the user. Key fob 32 wirelessly transmits RKE signal 34 directly to RKE receiver 24.

Figure 2:
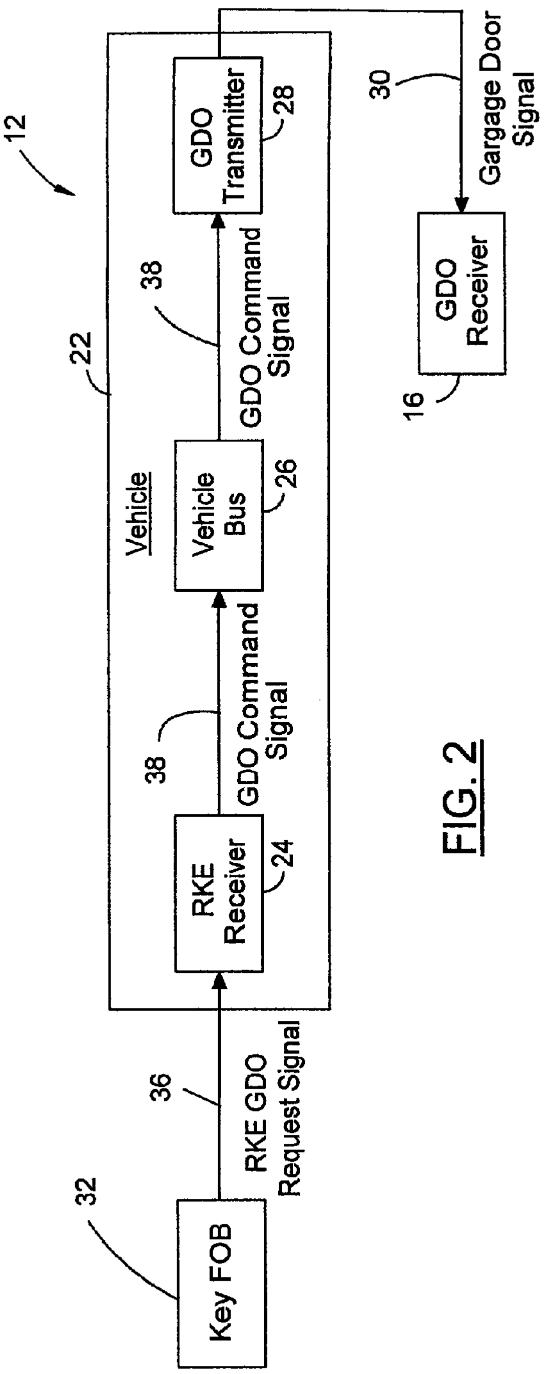
FIG. 2 illustrates a block diagram of the GDO system shown in FIG. 1 in which the key fob can remotely control a garage door via the RKE receiver and the GDO transmitter.

Referring now to FIG. 2, with continual reference to FIG. 1, a block diagram of GDO system 12 in which key fob 32 can remotely control a garage door via RKE receiver 24 and GDO transmitter 28 is shown. In general, RKE receiver 24 is in communication with GDO transmitter 28 via vehicle bus 26 such that in response to receiving an RKE GDO request signal 36 from key fob 32 the RKE receiver notifies the GDO transmitter to transmit a garage door signal 30 to GDO receiver 16. As a result, key fob 32 remotely controls the garage door via RKE receiver 24 and GDO transmitter 28.

In operation, key fob 32 generates a RKE GDO request signal 36 in response to a user activating the key fob. RKE GDO request signal 36 contains a code or command or the like which this RKE signal as being a request to control the garage door. That is, RKE GDO request signal 36 represents a request of the user of key fob 32 that a garage door signal be transmitted to GDO receiver 16 to control the garage door. Key fob 32 wirelessly transmits RKE GDO request signal 36 directly to RKE receiver 24 upon activation of the key fob by the user. RKE receiver 24 wirelessly receives RKE GDO request signal 36 from key fob 32. RKE receiver 24 decodes RKE GDO request signal 36 to determine that the user desires to control the garage door. RKE GDO request signal 36 may include information indicative of how the user desires to control (i.e., open or close) the garage door. In any event, as a result of receiving RKE GDO request signal 36, RKE receiver 24 is aware that a garage door signal is to be transmitted to GDO receiver 16 in order to control the garage door.

In response to receiving RKE GDO request signal 36, RKE receiver 24 transmits a GDO command signal 38 over vehicle bus 26 to GDO transmitter 28. GDO command signal 38 contains information identifying the action requested by the user of key fob 32 as decoded from RKE GDO request signal 36. As such, in its basic form, GDO command signal 38 provides an indication that GDO transmitter 28 is to transmit garage door signal 30 in order to control the garage door. Accordingly, upon receipt of GDO command signal 38, GDO transmitter 28 generates and directly transmits garage door signal 30 to GDO receiver 16 in order to control the garage door.

As a result of this operation of GDO system 12, a user can control the garage door by actuating key fob 32. Key fob 32 does not communicate directly with GDO receiver 16 to control the garage door. Rather, as described, key fob 32 essentially communicates indirectly with GDO receiver 16 via RKE receiver 24, vehicle bus 26, and GDO transmitter 28 to control the garage door.

Figure 3:
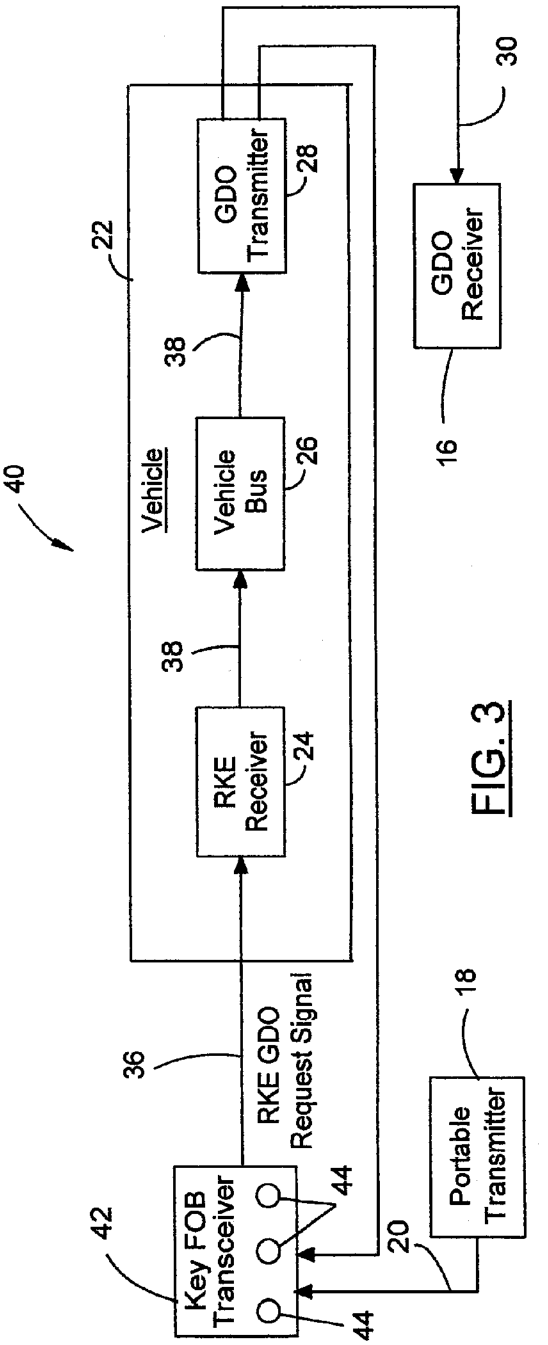
FIG. 3 illustrates a block diagram of a GDO system having a key fob and a RKE receiver and a GDO transmitter interconnected by a vehicle bus in which the GDO transmitter transmits a garage door signal to the fob for programming a button of the fob such that upon subsequent actuation of the fob button the fob transmits a RKE signal to the RKE receiver which in turn communicates with the GDO transmitter over the bus for the GDO transmitter to transmit the garage door signal in accordance with an embodiment of the present invention.

Referring now to FIG. 3, with continual reference to FIGS. 1 and 2, a GDO system 40 in accordance with an embodiment of the present invention is shown. GDO system 40 includes many of the same components as GDO system 12 and like components have the same reference numerals. GDO system 40 differs from GDO system 12 in at least one aspect as GDO system 40 includes a key fob transceiver 42 having a plurality of key fob buttons 44. Key fob 32 of GDO system 12 may also be a transceiver and may also have at least one key fob button which is to be actuated by a user to transmit RKE GDO request signal 36. However, the main role of key fob 32 of GDO system 12 in terms of controlling the garage door is that of a transmitter for transmitting RKE GDO request signal 36.

In general, key fob transceiver 42 is programmable to generate and transmit RKE GDO request signal 36 upon a user depressing a particular key fob button 44. That is, key fob transceiver 42 is programmable to associate a particular key fob button 44 with the control of the garage door.

In the operation for programming key fob transceiver 42 to associate a particular key fob button 44 with the control of the garage door, a user sets the key fob transceiver into a learn mode. The user then depresses a particular key fob button 44 that the user wishes to associate with the control of the garage door. During the same time interval, the user actuates GDO transmitter 28 to transmit garage door signal 30. The user may actuate GDO transmitter 28 when the GDO transmitter and key fob transceiver 42 are out of the vicinity of GDO receiver 16 such that the GDO receiver cannot receive garage door signal 30 in order to avoid unintended control of the garage door. During this time interval, key fob transceiver 42 listens for garage door signal 30. Upon receiving garage door signal 30, key fob transceiver 42 associates the particular key fob button 44 with the control of the garage door. As a result, in response to subsequent activation of the particular key fob button 44, key fob transceiver 42 transmits RKE GDO request signal 36 to RKE receiver 24 for the RKE receiver to notify GDO transmitter 28 to transmit garage door signal 30 to GDO receiver 16 to control the garage door as described with reference to FIG. 2.

Alternatively, portable transmitter 18 instead of GDO transmitter 28 may be used in the operation for programming key fob transceiver 42 to associate a particular key fob button 44 with the control of the garage door. Again, in this case, a user sets key fob transceiver 42 into a learn mode and depresses a particular key fob button 44 that the user wishes to associate with the control of the garage door. During the same time interval, the user actuates portable transmitter 18 to transmit garage door signal 20. The user may actuate portable transmitter 18 when the GDO transmitter and key fob transceiver 42 are out of the vicinity of GDO receiver 16 such that the GDO receiver cannot receive garage door signal 20 in order to avoid unintended control of the garage door. During this time interval, key fob transceiver 42 listens for garage door signal 20. Upon receiving garage door signal 20, key fob transceiver 42 associates the particular key fob button 44 with the control of the garage door. As a result, in response to subsequent activation of the particular key fob button 44, key fob transceiver 42 transmits RKE GDO request signal 36 to RKE receiver 24 for the RKE receiver to notify GDO transmitter 28 to transmit garage door signal 30 to GDO receiver 16 to control the garage door as described with reference to FIG. 2.

Figure 4:
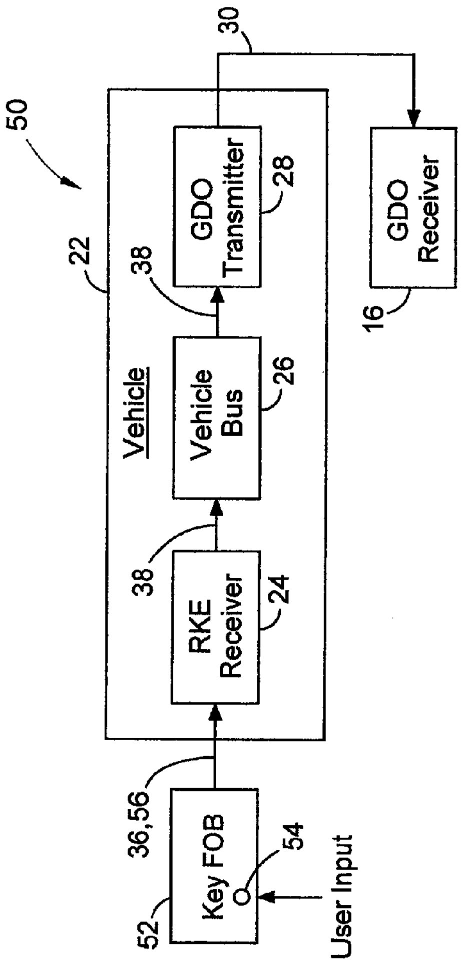
FIG. 4 illustrates a block diagram of a GDO system having a key fob and a RKE receiver and a GDO transmitter interconnected by a vehicle bus in which the fob transmits a sequence of different RKE signals to the RKE receiver for the RKE receiver to communicate over the vehicle bus to the GDO transmitter such that the GDO transmitter transmits a garage door signal upon the fob transmitting an expected RKE signal, wherein the fob is programmed to subsequently transmit the expected RKE signal without transmitting any of the remaining different RKE signals upon user feedback indicating successful transmission of the garage door signal by the GDO transmitter in accordance with an embodiment of the present invention.

Referring now to FIG. 4, with continual reference to FIGS. 1, 2, and 3, a GDO system 50 in accordance with an embodiment of the present invention is shown. GDO system 50 includes many of the same components as GDO system 12 and like components have the same reference numerals. GDO system 50 differs from GDO system 12 in at least one aspect as GDO system 50 includes a key fob 52 having a key fob button 54. As indicated, key fob 32 of GDO system 12 may also have a key fob button which is to be actuated by a user to transmit RKE GDO request signal 36. Likewise, key fob button 54 of key fob 52 may be actuated by a user to transmit RKE GDO request signal 36. However, key fob button 54 of key fob 52 has another role which is used during the programming of the key fob as will now be described. Further, key fob 52 is operable to generate and transmit a plurality of different RKE signals 56 one of which being RKE GDO request signal 36.

In general, key fob 52 is programmable to generate and transmit RKE GDO request signal 36 as opposed to generating and transmitting other RKE signals upon a user actuating the key fob to control the garage door. That is, key fob 52 is programmable to generate and transmit RKE GDO request signal 36 which is expected to be received by RKE receiver 24 for controlling the garage door. To this end, key fob 52 is operable for transmitting a plurality of different RKE signals 56 which include RKE GDO request signal 36. Key fob 52 is to be programmed to be made aware of which one of the different RKE signals 56 corresponds to RKE GDO request signal 36 such that after being programmed the key fob only transmits RKE GDO request signal 36 upon being actuated by a user to control the garage door.

In the operation for programming key fob 52 such that the key fob only transmits RKE GDO request signal 36 upon being actuated by a user to control the garage door, a user sets the key fob into a learn mode and then actuates the key fob. In response, key fob 52 generates and transmits sequentially one at a time a plurality of different RKE signals 56. That is, key fob 52 transmits a sequence of different RKE signals 56 to RKE receiver 24. After transmitting each RKE signal, key fob 52 waits for a predetermined amount of time sufficient for a user to observe initial control of the garage door before transmitting the next succeeding RKE signal. RKE receiver 24 analyzes each RKE signal received from key fob 52 to determine whether the RKE signal corresponds to RKE GDO request signal 36. Alternatively, RKE receiver 24 forwards the RKE signal received from key fob 52 to GDO transmitter 28 over vehicle bus 26 for the GDO transmitter to determine whether the RKE signal corresponds to RKE GDO request signal 36. In either event, upon RKE receiver 24 receiving from key fob 52 an RKE signal corresponding to RKE GDO request signal 36, the RKE receiver transmits GDO command signal 38 over the vehicle bus to GDO transmitter 28. In turn, GDO transmitter 28 transmits garage door signal 30 for receipt by GDO receiver 16. GDO receiver 16 then controls the garage door.

As such, GDO transmitter 28 transmits garage door signal 30 upon key fob 52 transmitting RKE GDO request signal 36 which is one of the different RKE signals which the key fob has transmitted up to this point during the programming of the key fob. However, key fob 52 is not yet made aware that the key fob has transmitted RKE GDO request signal 36 or that the key fob has in effect controlled actuation of the garage door.

To make key fob 52 aware of that the key fob has transmitted RKE GDO request signal 36, the user provides user input indicating successful control of the garage door upon observing the initial control of the garage door as a result of GDO transmitter 28 transmitting garage door signal 30 to GDO receiver 16. That is, key fob 52 waits a predetermined time for such user input after transmitting a RKE signal. If no user input, then key fob transmits the next RKE signal and again waits for the user input. This process continues until key fob 52 receives the user input which is to be provided by the user when the garage door is actuated. Again, the garage door is actuated upon GDO transmitter 28 transmitting garage door signal 30 which happens when key fob 52 transmits RKE GDO request signal 36. As such, key fob 52 is made aware of which RKE signal corresponds to RKE GDO request signal 36 and the key fob has now been programmed. Subsequently, key fob 52 only transmits RKE GDO request signal 36 without transmitting any of the remaining RKE signals 56 upon a user actuating the key fob to control the garage door.

Figure 5:
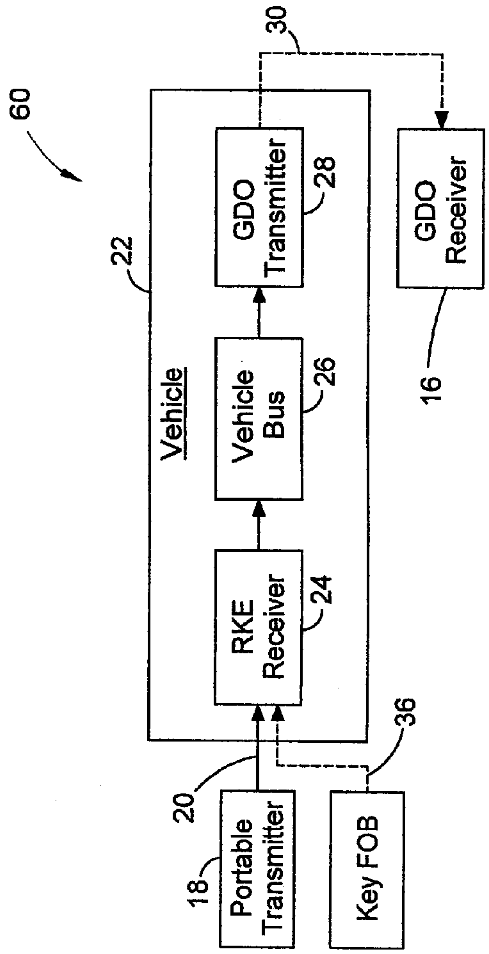
FIG. 5 illustrates a block diagram of a GDO system having a portable transmitter and a RKE receiver and a GDO transmitter interconnected by a vehicle bus in which the portable transmitter transmits a garage door signal to the RKE receiver which forwards the garage door signal to the GDO transmitter for the GDO transmitter to learn such that the GDO transmitter subsequently transmits the garage door signal upon actuation in accordance with an embodiment of the present invention.

Referring now to FIG. 5, with continual reference to FIGS. 1 and 2, a block diagram of a GDO system 60 in accordance with an embodiment of the present invention is shown. GDO system 60 includes many of the same components as GDO system 12 and like components have the same reference numerals.

In general, GDO system 60 is operable to use portable transmitter 18 to program GDO transmitter 28 such that GDO transmitter transmits garage door signal 30 upon RKE receiver 24 receiving RKE GDO request signal 36 from a key fob as described above. In the operation of programming GDO transmitter 28 to transmit garage door signal 30, GDO transmitter 28 is set to a learn mode and portable transmitter 18 transmits garage door signal 20 to RKE receiver 24. In turn, RKE receiver 24 forwards garage door signal 20 (or its equivalent) to GDO transmitter 28 for the GDO transmitter to learn. As indicated above, garage door signal 20 and garage door signal 30 essentially represent the same garage door signal. As such, GDO transmitter 28 is made aware of garage door signal 30 as being the garage door signal expected to be received by GDO receiver 16 for controlling the garage door. Subsequently, GDO transmitter 28 transmits garage door signal 30 to GDO receiver 16 upon RKE receiver 24 receiving RKE GDO request signal from a key fob as described above.

Other embodiments of the GDO system include the ability to operate more than one home appliance such as GDO receiver 16 with the use of a key fob and a RKE receiver and a GDO transmitter interconnected by a vehicle bus. In this case, the GDO transmitter is operable to transmit a garage door signal as well as at least one additional home appliance signal. Depending upon how many times a user actuates a button of the key fob to actuate the key fob, the key fob transmits a different corresponding RKE signal to the RKE receiver. In turn, the GDO transmitter transmits the signal (e.g., the garage door signal or a different home appliance signal) which corresponds to the RKE signal transmitted by the key fob. For example, the GDO transmitter transmits the garage door signal upon one activation of a button of the key fob and the GDO transmitter transmits a different home appliance signal upon two activations of the button of the key fob. Similarly, the key fob may have two buttons which respectively correspond to the transmission of the garage door signal and another home appliance signal.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A garage door opener system for a vehicle, the system comprising:

a portable key fob for wirelessly transmitting a remote keyless entry (RKE) garage door opener (GDO) request signal upon a user actuating the key fob and for wirelessly transmitting a RKE vehicle door operation request signal;

a RKE receiver for wirelessly receiving the RKE GDO request signal and for wirelessly receiving the RKE vehicle door operation request signal, wherein upon receiving the RKE vehicle door operation request signal the RKE receiver controls a door of the vehicle in accordance with the RKE vehicle door operation request signal;

a GDO transmitter for wirelessly transmitting a garage door signal to a GDO receiver of a garage to control a garage door and for wirelessly transmitting the garage door signal to the GDO receiver to control the garage door upon a user actuating the GDO transmitter; and a vehicle bus connecting the RKE receiver and the GDO transmitter;

wherein upon receiving the RKE GDO request signal from the key fob the RKE receiver forwards a command signal over the vehicle bus to the GDO transmitter, wherein upon receiving the command signal from the RKE receiver the GDO transmitter transmits the garage door signal.

2. The system of claim 1 wherein:

the vehicle bus includes at least one of a Local Interconnect Network and a Controller Area Network.

3. The system of claim 1 wherein:

the RKE receiver, the GDO transmitter, and the vehicle bus are integrated into the vehicle.

4. The system of claim 3 wherein:

the RKE receiver is part of a RKE system of the vehicle.

5. The system of claim 1 wherein:

the key fob includes a user activation input and is programmable in a learn mode;

wherein the key fob associates the user activation input with the transmission of the RKE GDO request signal from the key fob upon receiving the garage door signal from the GDO transmitter while the key fob is in the learn mode such that the key fob subsequently transmits the RKE GDO request signal in response to a user actuating the user activation input.

6. The system of claim 1 wherein:

the key fob is operable to transmit a plurality of different RKE signals including the RKE GDO request signal and is programmable in a learn mode;

wherein while in the learn mode the key fob sequentially transmits the different RKE signals until user feedback indicates transmission of the RKE GDO request signal by the key fob such that the key fob is made aware of which of the different RKE signals corresponds to the RKE GDO request signal, wherein the key fob subsequently transmits the RKE GDO request signal without transmitting any of the remaining RKE signals in response to a user actuating the key fob.

7. The system of claim 1 further comprising:

a portable transmitter for wirelessly transmitting the garage door signal upon actuation by a user.

8. The system of claim 7 wherein:

the GDO transmitter is programmable in a learn mode;

wherein while the GDO transmitter is the learn mode the portable transmitter is actuated to transmit the garage door signal, wherein upon reception of the garage door signal by the RKE receiver from the portable transmitter the RKE receiver forwards the garage door signal over the vehicle bus to the GDO transmitter for the GDO transmitter to learn, wherein the GDO transmitter subsequently transmits the garage door signal in response to receiving the command signal from the RKE receiver.

9. A garage door opener system for a vehicle, the system comprising:

a remote keyless entry (RKE) receiver;

a garage door opener (GDO) transmitter for transmitting a garage door signal to a GDO receiver of a garage to control a garage door and for transmitting the garage door signal to the GDO receiver to control the garage door upon a user actuating the GDO transmitter;

a vehicle bus connecting the RKE receiver and the GDO transmitter;

wherein upon receiving a RKE GDO request signal from a key fob the RKE receiver forwards a command signal over the vehicle bus to the GDO transmitter, wherein upon receiving the command signal from the RKE receiver the GDO transmitter transmits the garage door signal;

wherein upon receiving a RKE vehicle door operation request signal from the key fob the RKE receiver controls a door of the vehicle in accordance with the RKE vehicle door operation request signal.

10. The system of claim 9 wherein:

the vehicle bus includes at least one of a Local Interconnect Network and a Controller Area Network.

11. The system of claim 9 wherein:

the RKE receiver, the GDO transmitter, and the vehicle bus are integrated into the vehicle.

12. The system of claim 11 wherein:

the RKE receiver is part of a RKE system of the vehicle.

13. The system of claim 9 further comprising:

a portable transmitter for transmitting the garage door signal upon actuation by a user;

wherein GDO transmitter is programmable in a learn mode, wherein while the GDO transmitter is the learn mode the portable transmitter is actuated to transmit the garage door signal, wherein upon reception of the garage door signal by the RKE receiver from the portable transmitter the RKE receiver forwards the garage door signal over the vehicle bus to the GDO transmitter for the GDO transmitter to learn, wherein the GDO transmitter subsequently transmits the garage door signal in response to receiving the command signal from the RKE receiver.

14. A garage door opener method for a vehicle, the method comprising:

transmitting a remote keyless entry (RKE) garage door opener (GDO) request signal from a key fob;

transmitting a RKE vehicle door operation request signal from the key fob;

receiving the RKE GDO request signal at a RKE receiver;

receiving the RKE vehicle door operation request signal at the RKE receiver;

communicating a command signal from the RKE receiver onto a vehicle bus connected to the RKE receiver in response to the RKE receiver receiving the RKE GDO request signal;

receiving the command signal from the vehicle bus at a GDO transmitter connected to the vehicle bus;

transmitting a garage door signal from the GDO transmitter for reception of a GDO receiver of a garage in order to control a garage door in response to the GDO transmitter receiving the command signal;

controlling a door of the vehicle in accordance with the RKE vehicle door operation request signal by the RKE receiver in response to the RKE receiver receiving the RKE vehicle door operation request signal; and transmitting the garage door signal from the GDO transmitter for reception by the GDO receiver in order to control the garage door in response to a user actuating the GDO transmitter.

15. The method of claim 14 wherein:

transmitting a RKE GDO request signal from a key fob occurs in response to a user actuating the key fob.

16. The method of claim 14 wherein:

the RKE receiver, the GDO transmitter, and the vehicle bus are integrated into the vehicle.

17. The method of claim 14 wherein the key fob includes a user activation input and is programmable in a learn mode, the method further comprising:

prior to transmitting the RKE GDO request signal from the key fob and while the key fob is in the learn mode, transmitting the garage door signal from the GDO transmitter, receiving the garage door signal at the key fob, and associating the user activation input with the transmission of the RKE GDO request signal from the key fob upon receiving the garage door signal from the GDO transmitter such that the key fob subsequently transmits the RKE GDO request signal in response to a user actuating the user activation input.

18. The method of claim 14 wherein the key fob is operable to transmit a plurality of different RKE signals including the RKE GDO request signal and is programmable in a learn mode, the method further comprising:

prior to transmitting the RKE GDO request signal from the key fob and while the key fob is in the learn mode, sequentially transmitting the different RKE signals from the key fob until user feedback indicates transmission of the RKE GDO request signal by the key fob such that the key fob is made aware of which of the different RKE signals corresponds to the RKE GDO request signal, and subsequently transmitting the RKE GDO request signal without transmitting any of the remaining RKE signals from the key fob in response to a user actuating the key fob.

19. The method of claim 14 further comprising:

transmitting the garage door signal from a portable transmitter upon actuation of the portable transmitter by a user.

20. The method of claim 19 wherein the GDO transmitter is programmable in a learn mode, the method further comprising:

prior to transmitting the RKE GDO request signal from the key fob and while the GDO transmitter is the learn mode, actuating the portable transmitter to transmit the garage door signal, receiving the garage door signal from the portable transmitter at the RKE receiver, and forwarding the garage door signal over the vehicle bus to the GDO transmitter for the GDO transmitter to learn such that the GDO transmitter subsequently transmits the garage door signal in response to receiving the command signal from the RKE receiver.

* * * * *